US012639821B2

(12) United States Patent
Song et al.

(10) Patent No.: US 12,639,821 B2
(45) Date of Patent: May 26, 2026

(54) ULTRASOUND IMAGE SEGMENTATION METHOD AND APPARATUS, TERMINAL DEVICE, AND STORAGE MEDIUM

(71) Applicant: SHENZHEN INSTITUTES OF ADVANCED TECHNOLOGY CHINESE ACADEMY OF SCIENCES, Shenzhen (CN)

(72) Inventors: Yuxin Song, Shenzhen (CN); Baoliang Zhao, Shenzhen (CN); Ying Hu, Shenzhen (CN); Long Lei, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 364 days.

(21) Appl. No.: 18/366,706

(22) Filed: Aug. 8, 2023

(65) Prior Publication Data

US 2023/0386048 A1 Nov. 30, 2023

Related U.S. Application Data

(63) Continuation of application No. PCT/CN2021/138011, filed on Dec. 14, 2021.

(30) Foreign Application Priority Data

Apr. 7, 2021 (CN) .......................... 202110374019.2

(51) Int. Cl.
G06T 7/149 (2017.01)
(52) U.S. Cl.
CPC .... G06T 7/149 (2017.01); G06T 2207/10072 (2013.01); G06T 2207/10132 (2013.01); G06T 2207/20081 (2013.01)

(58) Field of Classification Search
None
See application file for complete search history.

(56) References Cited

U.S. PATENT DOCUMENTS

| | | | |
|---|---|---|---|
| 2019/0261945 A1* | 8/2019 | Funka-Lea | G06T 15/205 |
| 2021/0012885 A1 | 1/2021 | Arafati et al. | |
| 2021/0042575 A1 | 2/2021 | Firner | |
| 2021/0081698 A1* | 3/2021 | Lindeman | G06Q 30/0283 |
| 2021/0256315 A1* | 8/2021 | Harrison | G06T 7/0012 |

FOREIGN PATENT DOCUMENTS

| | | |
|---|---|---|
| CN | 110010229 A | 7/2019 |
| CN | 110074813 A | 8/2019 |

(Continued)

OTHER PUBLICATIONS

International Search Report dated Mar. 1, 2022 in International Application No. PCT/CN2021/138011. English translation attached.

(Continued)

*Primary Examiner* — Jiangeng Sun

(57) ABSTRACT

The present disclosure relates to the field of image processing technologies, and provides an ultrasound image segmentation method and apparatus, a terminal device, and a storage medium. With the method, simulated ultrasound images are synthesized based on Computed Tomography (CT) images. An image segmentation model is pre-trained using the synthesized simulated ultrasound images. The pre-trained image segmentation model is migrated, by employing a transfer learning method, to real sample ultrasound images for further training to obtain a final image segmentation model. A segmentation processing on an ultrasound image to be segmented is completed by the final image segmentation model. In this way, the ultrasound images synthesized based on the CT images can be used to replace a part of training data, thereby solving a problem of lack of training data when training the image segmentation model.

14 Claims, 5 Drawing Sheets

(56) References Cited

FOREIGN PATENT DOCUMENTS

| | | | | | |
|----|------------|----|---|---------|------------|
| CN | 110599448  | A  |   | 12/2019 | |
| CN | 110674866  | A  |   | 1/2020  | |
| CN | 110010229  | B  | * | 6/2020  | ............ G06N 3/045 |
| CN | 111260741  | A  |   | 6/2020  | |
| CN | 111915626  | A  |   | 11/2020 | |
| CN | 113012041  | A  |   | 6/2021  | |
| CN | 113112559  | A  |   | 7/2021  | |
| EP | 3620988    | A1 | * | 3/2020  | ............ G06F 30/20 |

OTHER PUBLICATIONS

First Office Action from corresponding Chinese Application No. 202110374019.2 , dated May 7, 2022. English translation attached.
Second Office Action from corresponding Chinese Application No. 202110374019.2, dated Jul. 20, 2022. English translation attached.
Zhang, Zizhao et al. "Translating and Segmenting Multimodal Medical Volumes with Cycle- and Shape•Consistency Generative Adversarial Network" CT2US: Cross-modal transfer learning for kidney segmentation in ultrasound images with synthesized data, 2018, pp. 9242-9251, doi: 10.1109/CVPR.2018.00963.
Cao, Yu et al. "Detection of Pulmonary Nodules Based on Improved VGG-16 Convolution Neural Network" Chinese Journal of Medical Physics, vol. 037, No. 007, Jul. 2020 (Jul. 2020).
Jennifer P. Kieselmann et al."Cross-modality deep learning: Contouring of MRI data from annotated CT data only" Medical Physics, vol. 48, Issue 4, Nov. 30, 2020 (Nov. 30, 2020).
Gong, Ronglin et al. "Hybrid Supervised Dual-channel Feedback U-Net for Segmentation of Breast Ultrasound Images" Journal of Image and Graphics, 2020,25(10):2206-2217.

* cited by examiner

ULTRASOUND IMAGE SEGMENTATION METHOD AND APPARATUS, TERMINAL DEVICE, AND STORAGE MEDIUM

CROSS-REFERENCE TO RELATED APPLICATIONS

This application is a continuation of International Application No. PCT/CN2021/138011 filed on Dec. 14, 2021, which claims priority to Chinese patent application No. 202110374019.2, filed on Apr. 7, 2021, both of which are hereby incorporated by reference in their entireties.

FIELD

The present disclosure relates to the field of image processing technologies, and more particularly, to an ultrasound image segmentation method and apparatus, a terminal device, and a storage medium.

BACKGROUND

Ultrasound images are widely used in the field of clinical medicine for their advantages of being affordable, radiation-free, non-invasive, and real-time. An accurate and rapid quantitative segmentation of ultrasound images can be used to aid in the diagnosis of lesion type and lesion size, providing a reference for decision-making by healthcare professionals.

To address problems inherent in ultrasound images such as large amount of noise, low resolution, blurred boundaries, low contrast, and dependence on operator experience, deep learning technologies are often used to segment ultrasound images. However, when training an image segmentation model, a large amount of training data having labels is required, but there is no publicly available training dataset for an ultrasound image segmentation due to time-consuming and laborious acquisition and manual labeling of ultrasound images. Therefore, there is a problem of lack of training data.

SUMMARY

In view of the above problems, embodiments of the present disclosure provide an ultrasound image segmentation method and apparatus, a terminal device, and a storage medium, capable of solving a problem of lack of training data when training an image segmentation model.

According to an embodiment in a first aspect of the present disclosure, an ultrasound image segmentation method is provided. The method includes: acquiring an ultrasound image to be segmented; and inputting the ultrasound image to be segmented into a trained image segmentation model, to obtain an image segmentation result of the ultrasound image to be segmented. The image segmentation model is obtained by training including: performing pre-training by using simulated ultrasound images as a training set to obtain an initial segmentation model, each of the simulated ultrasound images being an ultrasound image synthesized based on a Computed Tomography (CT) image; and continuing training, by employing a transfer learning method, the initial segmentation model using sample ultrasound images as a training set, to obtain the image segmentation model, each of the sample ultrasound images being an ultrasound image pre-collected as a training sample.

In the embodiments of the present disclosure, simulated ultrasound images are synthesized based on CT images. The image segmentation model is pre-trained using the synthesized simulated ultrasound images. The image segmentation model is migrated, by employing the transfer learning method, to real sample ultrasound images for further training to obtain a final image segmentation model. A segmentation processing on the ultrasound image to be segmented is completed by the final image segmentation model. In this way, the ultrasound images synthesized based on the CT images can be used to replace a part of training data, thereby solving the problem of lack of training data when training the image segmentation model.

In an embodiment of the present disclosure, the simulated ultrasound image can be synthesized by: acquiring a pre-collected CT dataset; performing a pre-processing operation on the CT dataset to obtain a target CT image; and inputting the target CT image into a pre-trained cycle generative adversarial network to synthesize the simulated ultrasound image.

Further, the CT dataset includes CT images in a three-dimensional volume data format. The performing the pre-processing operation on the CT dataset to obtain the target CT image can include: adjusting a window level and a window width of the CT images in the CT dataset; obtaining a plurality of two-dimensional slice CT images by performing a slicing operation on three-dimensional volume data of the CT images in the CT dataset along specified directions, respectively; and extracting, from the plurality of two-dimensional slice CT images, an image of a region of interest as the target CT image.

Further, the CT images of the CT dataset each have a predetermined label. The predetermined label marks a contour of a specified target in the CT image. The method can further include, subsequent to the obtaining the plurality of two-dimensional slice CT images: deleting, from the plurality of two-dimensional slice CT images, a slice CT image in which a size of a contour of a specified target is smaller than a predetermined threshold. The extracting, from the plurality of two-dimensional slice CT images, the image of the region of interest includes: for each of the plurality of two-dimensional slice CT images, calculating, based on the contour of the specified target in the CT image, a position of a center of mass of the specified target in the CT image, and framing, centered on the position of the center of mass, an image region of a specified size from the CT image as the image of the region of interest extracted from the CT image.

In an embodiment of the present disclosure, the cycle generative adversarial network can be obtained by training including: in a forward cycle and a backward cycle of the cycle generative adversarial network, calculating a cycle consistency loss function of the cycle generative adversarial network based on a cyclic initial image and a reconstructed image, the forward cycle being a process of synthesizing the CT image into the simulated ultrasound image and reconstructing the simulated ultrasound image as the CT image, the backward cycle being a process of synthesizing the ultrasound image into a simulated CT image and reconstructing the simulated CT image as the ultrasound image, the cyclic initial image including an initial CT image in the forward cycle and an initial ultrasound image in the backward cycle, and the reconstructed image including CT image reconstructed in the forward cycle and the ultrasound image reconstructed in the backward cycle; calculating, based on the cyclic initial image and the reconstructed image, an adversarial loss function of the cycle generative adversarial network; determining, based on the cycle consistency loss function and the adversarial loss function, a target loss function; and completing, based on the target loss function, training of the cycle generative adversarial network.

Further, the method can further include: calculating, based on the cyclic initial image and the reconstructed image, a shape consistency loss function of the cycle generative adversarial network, the shape consistency loss function being used to measure a degree of difference between a contour shape of a specified target contained in an input image of the cycle generative adversarial network and a contour shape of a specified target contained in an output image of the cycle generative adversarial network. The determining, based on the cycle consistency loss function and the adversarial loss function, the target loss function includes determining the target loss function based on the cycle consistency loss function, the adversarial loss function, and the shape consistency loss function.

Further, the calculating, based on the cyclic initial image and the reconstructed image, the shape consistency loss function of the cycle generative adversarial network can include: calculating the shape consistency loss function of the cycle generative adversarial network in accordance with the following equation:

$$L_{shape}(G,F,S_X,S_Y)=E_{x \sim p_{data}(x)}[-t_Y \log(S_Y(F(x)))]+ \\ E_{y \sim p_{data}(y)}[-t_X \log(S_X(G(y)))],$$

where $L_{shape}(G,F,S_X,S_Y)$ represents the shape consistency loss function, G and F represent two generators of the cycle generative adversarial network in a cycle in a same direction, x represents an initial image of the cycle, y represents the reconstructed image, X represents an image domain of the initial image of the cycle, Y represents an image domain of the reconstructed image, tx represents a contour shape of a specified target contained in the initial image of the cycle, ty represents a contour shape of a specified target contained in the reconstructed image, F(x) represents an output image obtained subsequent to input of an image x into the generator F, G(y) represents an output image obtained subsequent to input of an image y into the generator G, Sx and Sy represent two auxiliary mapping relations for mapping images of the image domain X and the image domain Y into a same shape space, E represents solving a mathematical expectation, a subscript x~Pdata(x) corresponding to E represents a probability distribution of the image x, and a subscript y~Pdata (y) corresponding to E represents a probability distribution of the image y.

According to an embodiment in a second aspect of the present disclosure, an ultrasound image segmentation apparatus is provided. The apparatus includes: an ultrasound image acquiring module configured to acquire an ultrasound image to be segmented; an image segmentation module configured to input the ultrasound image to be segmented into a trained image segmentation model, to obtain an image segmentation result of the ultrasound image to be segmented; a first model training module configured to perform pre-training by using simulated ultrasound images as a training set to obtain an initial segmentation model, each of the simulated ultrasound images being an ultrasound image synthesized based on a CT image; and a second model training module configured to continue training, by employing a transfer learning method, the initial segmentation model using sample ultrasound images as a training set, to obtain the image segmentation model, each of the sample ultrasound images being an ultrasound image pre-collected as a training sample.

According to an embodiment in a third aspect of the present disclosure, a terminal device is provided. The terminal device includes a memory, a processor, and a computer program stored in the memory and executable on the processor. The processor, when executing the computer program, implements the ultrasound image segmentation method according to an embodiment in the first aspect of the present disclosure.

According to an embodiment in a fourth aspect of the present disclosure, a computer-readable storage medium is provided. The computer-readable storage medium stores a computer program. The computer program, when executed by a processor, implements the ultrasound image segmentation method according to an embodiment in the first aspect of the present disclosure.

According to an embodiment in a fifth aspect of the present disclosure, a computer program product is provided. The computer program product, when executed on a terminal device, causes the terminal device to perform the ultrasound image segmentation method according to an embodiment in the first aspect of the present disclosure.

It should be understood that advantageous effects of the second aspect to the fifth aspect described above can be referred to relevant description in the first aspect described above and details thereof will be omitted herein.

BRIEF DESCRIPTION OF THE DRAWINGS

In order to clearly explain technical solutions of embodiments of the present disclosure, drawings used in the description of the embodiments or the related art are briefly described below. The drawings as described below are merely some embodiments of the present disclosure. Based on these drawings, other drawings can be obtained by those skilled in the art without creative effort.

DETAILED DESCRIPTION

In the following description, for illustration rather than limitation, specific details such as particular system structures and techniques are provided to facilitate a thorough understanding of embodiments of the present disclosure. However, it should be clear to those skilled in the art that the present disclosure can be realized in other embodiments without these specific details. In other cases, detailed description of well-known systems, apparatuses, circuits, and methods are omitted to prevent unnecessary details from impeding the description of the present disclosure. In addition, in the description of the specification of the present disclosure and the appended claims, terms "first", "second", "third" etc. are used only to distinguish the description and cannot be understood as indicating or implying relative importance.

The present disclosure provides an ultrasound image segmentation method and apparatus, a terminal device, and a storage medium, capable of solving a problem of lack of training data when training an image segmentation model. It should be understood that an executive subject of each of the method embodiments of the present disclosure is various types of terminal devices or servers, such as a mobile phone, a tablet personal computer, a laptop, a desktop computer, and a wearable device.

Figure 1:
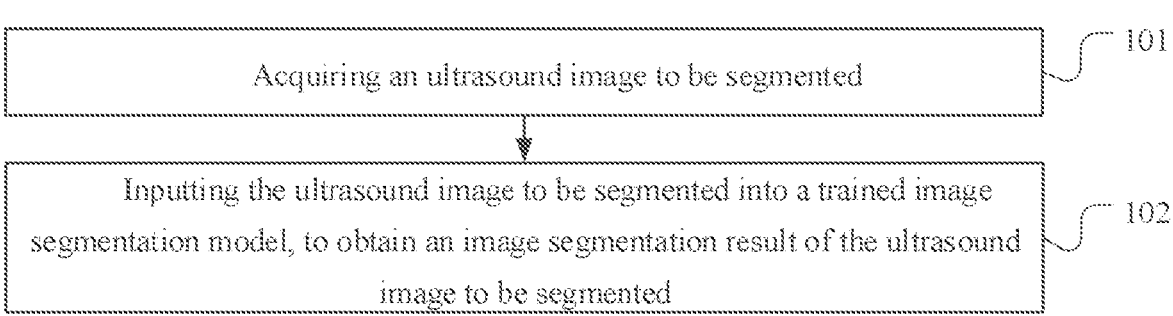
FIG. 1 is a flowchart illustrating an embodiment of an ultrasound image segmentation method according to an embodiment of the present disclosure.

FIG. 1 illustrates an ultrasound image segmentation method according to an embodiment of the present disclosure. As illustrated in FIG. 1, the method includes operations at blocks.

At block 101, an ultrasound image to be segmented is acquired.

The ultrasound image to be segmented is acquired. The ultrasound image to be segmented is an ultrasound image on which an image segmentation is to be performed, and can be an ultrasound image of any type and having any content. The embodiment is not limited in this regard.

At block 102, the ultrasound image to be segmented is inputted into a trained image segmentation model, to obtain an image segmentation result of the ultrasound image to be segmented.

Figure 2:
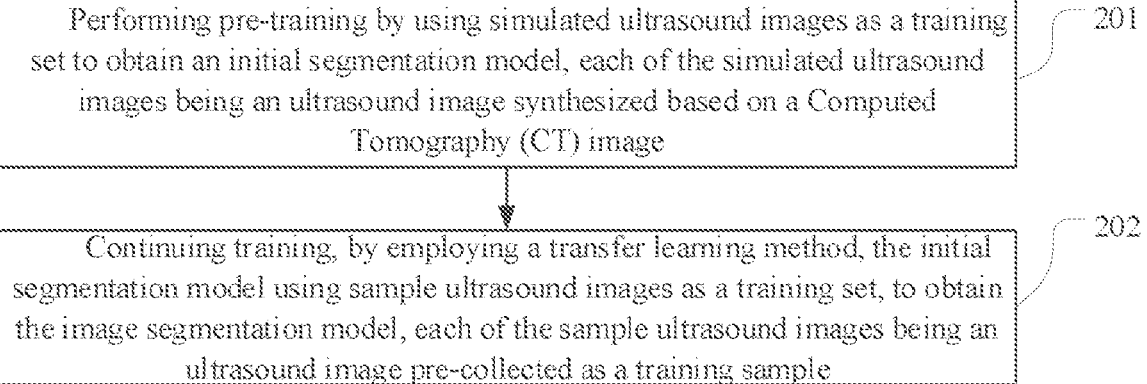
FIG. 2 is a flowchart illustrating training an image segmentation model according to an embodiment of the present disclosure.

The image to be segmented is inputted into the trained image segmentation model subsequent to obtaining of the image to be segmented, to obtain a corresponding image segmentation result. In the related art, training the image segmentation model requires a large amount of training data having labels, which easily leads to the problem of lack of training data. To overcome the defect, the present disclosure provides a new method for training the image segmentation model. As illustrated in FIG. 2, the image segmentation model can be obtained by training including the following operations.

At block 201, pre-training is performed by using simulated ultrasound images as a training set to obtain an initial segmentation model. Each of the simulated ultrasound images is an ultrasound image synthesized based on a CT image.

To solve the problem of lack of training data of the ultrasound image, the present disclosure provides a method of synthesizing the simulated ultrasound images based on the CT images. The image segmentation model is pre-trained using the synthesized simulated ultrasound images, and then migrated to a real ultrasound image training set, thus solving the problem of lack of training data in the real ultrasound image training set.

In an embodiment of the present disclosure, the simulated ultrasound image may be synthesized in the following way.

(1) A pre-collected CT dataset is acquired.

(2) A pre-processing operation is performed on the CT dataset to obtain a target CT image.

(3) The target CT image is inputted into a pre-trained cycle generative adversarial network to synthesize the simulated ultrasound image.

For the above step (1), the pre-collected CT dataset may be three-dimensional volume format data having a label. The label marks a contour of a specified target in the CT dataset, such as a contour of a kidney, a contour of a kidney tumor, or the like.

For the above step (2), a series of pre-processing operations need to be performed on the CT dataset subsequent to acquisition of the CT dataset, to obtain the target CT image for synthesizing the ultrasound image. In some embodiments, the CT dataset includes CT images in a three-dimensional volume data format. The above step (2) may include the following operations.

(2.1) A window level and a window width of the CT images in the CT dataset are adjusted.

To optimize a display quality of a specified target (e.g., a kidney) in the acquired CT images, the window level and the window width of the CT images in the CT dataset may be adjusted. For example, on a basis of clinical experience, the window level may be adjusted to 30, and the window width may be adjusted to 300. A grayscale inversion processing may be performed on the CT images in the CT dataset. That is, a grayscale value of each pixel in each of the CT images is subtracted from 255, and an absolute value of the difference is taken.

(2.2) A plurality of two-dimensional slice CT images is obtained by performing a slicing operation on three-dimensional volume data of the CT images in the CT dataset along specified directions, respectively.

To obtain two-dimensional CT images, the slicing operation may be performed on the three-dimensional volume data of the CT images in the CT dataset along the specified directions, respectively. For example, for three-dimensional volume data in a dicom format, the slicing operation may be performed in three directions: an axial direction, a coronal direction, and a sagittal direction. One two-dimensional slice CT image (e.g., an image having a resolution of 512*512 in a png format) may be obtained by performing the slicing operation once in each direction. In practice, a plurality of slicing operations are performed in each direction, thus a plurality of two-dimensional slicing CT images is obtained for each direction. This process, which can also be called a visualization processing of the CT dataset, is essentially reading a two-dimensional image of a layer of volume data along a direction, and is similar to the action of slicing bread.

Further, the CT images of the CT dataset each have a predetermined label. The predetermined label marks a contour of a specified target in the CT image. The method further includes, subsequent to the obtaining the plurality of two-dimensional slice CT images: deleting, from the plurality of two-dimensional slice CT images, a slice CT image in which a size of a contour of a specified target is smaller than a predetermined threshold.

During the visualisation processing of the CT dataset, a process of filtering the slice CT images may be added to delete slice CT images failing to meet a requirement from the plurality of slice CT images obtained. The filtering may be performed based on manual labels in the CT dataset. Each manual label marks the contour of the specified target in the CT image. In some embodiments, the slice CT image in which the size of the contour of the specified target is smaller than the predetermined threshold may be deleted from the slice CT images to achieve an effect of acquiring two-dimensional CT images containing the specified target object from the CT dataset. For example, each manual label in the CT dataset marks the contour of the kidney and the contour of the kidney tumor (if there is a tumor in the image). When the size of the contour of the kidney in the manual label corresponding to the obtained slice CT image is greater than the predetermined threshold, the slice CT image may be determined as having a large enough kidney tissue image. Thus, the slice CT image passes the filtering. Otherwise, the slice CT image is determined as having no kidney image or having an image of a too small portion of the kidney. Thus, the slice CT image is useless and fails the filtering.

(2.3) An image of a region of interest is extracted from the plurality of two-dimensional slice CT images as the target CT image.

Subsequent to the obtaining of the plurality of two-dimensional slice CT images, a corresponding region of interest image is extracted from each image and used as the target CT image for synthesizing the simulated ultrasound image. For example, a region of the CT image centered on the specified target (e.g., the kidney) may be extracted as the region of interest (ROI).

In some embodiments, extracting the image of the region of interest may include: for each of the plurality of two-dimensional slice CT images, calculating, based on the contour of the specified target in the CT image, a position of a center of mass of the specified target in the CT image, and framing, centered on the position of the center of mass, an image region of a specified size from the CT image as the image of the region of interest extracted from the CT image.

For example, for a slice CT image of a size 512*512, the position of the center of mass of the specified target is calculated based on the contour of the specified target. An image region of a size 64*64 is framed, centered on the position of the center of mass, from the slice CT image as the image of the corresponding region of interest, i.e., the target CT image described above.

For step (3), the target CT image is inputted into the pre-trained cycle generative adversarial network subsequent to the obtaining of the target CT image, to synthesize the simulated ultrasound image corresponding to the target CT image, thereby achieving a conversion from the CT image to the ultrasound image. By extracting CT images of the region of interest to synthesize the simulated ultrasound images, it is possible to make a field of view of the synthesized simulated ultrasound image as close as possible to that of a real ultrasound image.

In addition, in the above step (3), the cycle generative adversarial network may be obtained by training including the following operations.

(3.1) In a forward cycle and a backward cycle of the cycle generative adversarial network, a cycle consistency loss function of the cycle generative adversarial network is calculated based on a cyclic initial image and a reconstructed image. The forward cycle is a process of synthesizing the CT image into the simulated ultrasound image and reconstructing the simulated ultrasound image as the CT image. The backward cycle is a process of synthesizing the ultrasound image into a simulated CT image and reconstructing the simulated CT image as the ultrasound image. The cyclic initial image includes an initial CT image in the forward cycle and an initial ultrasound image in the backward cycle. The reconstructed image includes the CT image reconstructed in the forward cycle and the ultrasound image reconstructed in the backward cycle.

(3.2) An adversarial loss function of the cycle generative adversarial network is calculated based on the cyclic initial image and the reconstructed image.

(3.3) A target loss function is determined based on the cycle consistency loss function and the adversarial loss function.

(3.4) Training of the cycle generative adversarial network is completed based on the target loss function.

In an embodiment of the present disclosure, the target CT image is synthesized into the simulated ultrasound image by using the cycle generative adversarial network, i.e., Cycle- GAN. CycleGAN is based on a fundamental assumption that excellent image synthesis should be bi-directional and reversible. In particular, in the present disclosure, the fundamental assumption means that CycleGAN can not only synthesize a pre-processed CT image into the simulated ultrasound image and reconstruct the simulated ultrasound image into the CT image, which corresponds to the forward cycle mentioned above; but also convert the real ultrasound image into the simulated CT image and reconstruct the simulated CT image into the ultrasound image, which corresponds to the backward cycle mentioned above. Like other generative adversarial networks, CycleGAN carries out adversarial training learning with two parts: a generator, which is expected to generate more realistic simulated images, and a discriminator, which is expected to accurately discriminate whether an input image is a real image or a generated simulated image.

CycleGAN uses two types of generators, which can be represented as $G_{CT2US}$ and $G_{US2CT}$ respectively. $G_{CT2US}$ is configured to implement generation from the CT images to the ultrasound images while $G_{US2CT}$ is configured to implement generation from the ultrasound images to the CT images, in which subscripts represents directions of image generation. There is one $G_{CT2US}$ and one $G_{US2CT}$ for the forward cycle, and similarly, one $G_{CT2US}$ and one $G_{US2CT}$ for the backward cycle, i.e., CycleGAN has a total of four generators. In addition, the technical means of weight sharing can be used between generators of the same type. That is, network structures and parameters of two generators can be kept the same. When the network parameters are updated by back propagation during training of CycleGAN, the network structures and parameters of the two generators are updated simultaneously. In practice, network structures of the four generators may be substantially the same. For example, the four generators may all be composed of three convolutional layers, a number of residual modules, two strided convolutional layers, and a final convolutional layer. In terms of functional structure, the generator may be composed of an encoder, a converter, and a decoder. The encoder is configured to extract a feature from the input CT image by using a convolutional neural network and compress the CT image into a feature vector. The converter is configured to convert a feature vector of an image in a CT image domain into a feature vector in a US (ultrasound) image domain by combining dissimilar features of the images. In some embodiments, the converter may be implemented as a 6-layer Reset module. Each Reset module is a neural network made up of two convolutional layers, and can achieve a goal of converting an image while preserving an original image feature. The decoder is configured to complete an operation of reducing a low-level image feature from the feature vector by using a deconvolutional layer, and obtain the generated simulated ultrasound image. In particular, the target CT image is inputted into the generator $G_{CT2US}$, and a simulated ultrasound image corresponding to the target CT image is generated subsequent to an implementation of the above operations; and the simulated CT image is inputted into the generator $G_{CT2US}$, and the reconstructed ultrasound image is obtained subsequent to an implementation of the above operations. In addition, operations subsequent to inputting the ultrasound image into the generator $G_{US2CT}$ are similar to those subsequent to inputting the CT image into the generator $G_{CT2US}$, but a direction of the image conversion is reversed.

CycleGAN has two discriminators, which can be represented as $D_{US}$ and $D_{CT}$ respectively. $D_{US}$ is configured to discriminate whether the input image is the real ultrasound image or the generated simulated ultrasound image. $D_{CT}$ is configured to discriminate whether the input image is the real CT image or the generated simulated CT image. Each of the two discriminators may adopt a structure of PathGAN made up of three strided convolutional layers. The discriminator itself belongs to a convolutional network, which needs to extract a feature from an image, and determines, by adding a convolutional layer that produces a one-dimensional output, whether the extracted feature belongs to a specific category (i.e., the real image or the simulated image).

Figure 3:
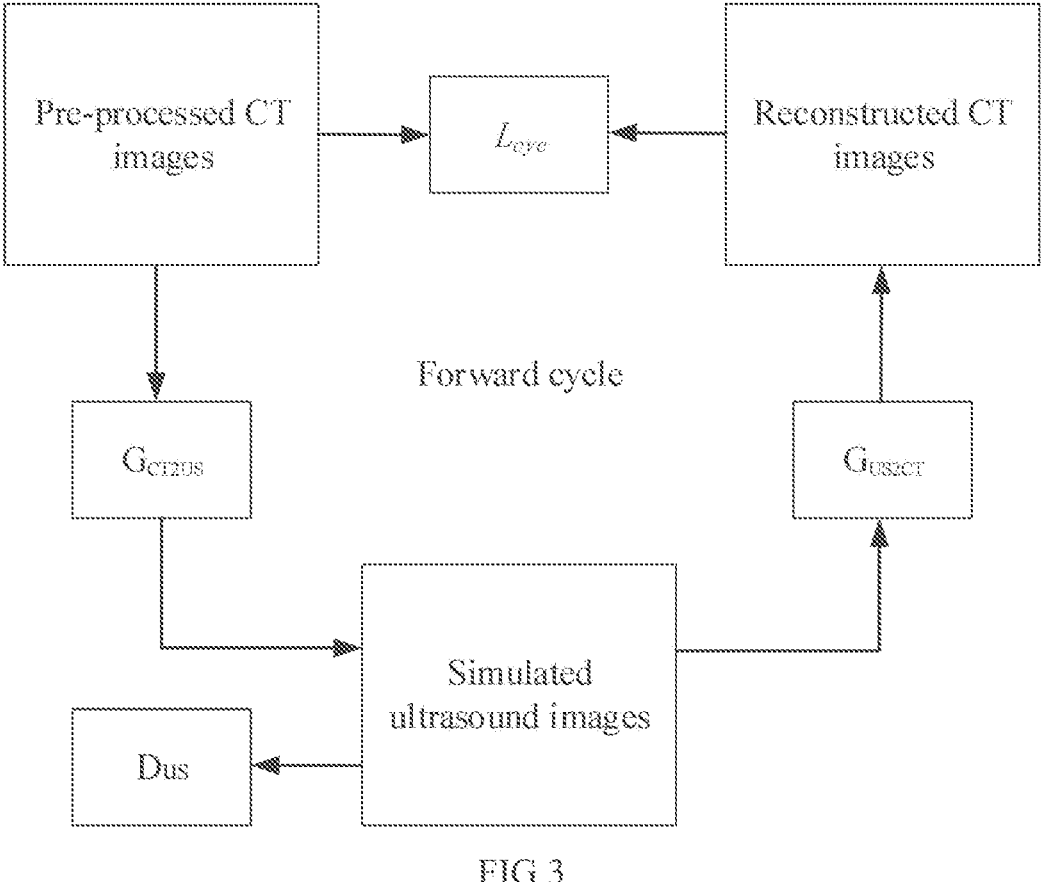
FIG. 3 is a schematic diagram of a processing of a forward cycle of a cycle generative adversarial network according to an embodiment of the present disclosure.

A schematic diagram of a processing of the forward cycle of CycleGAN is illustrated in FIG. 3. The pre-processed CT image is processed by the generator $G_{CT2US}$ to generate the simulated ultrasound image. The simulated ultrasound image is processed by the generator $G_{US2CT}$ to obtain the reconstructed CT image. The discriminator $D_{US}$ is configured to determine whether the generated simulated ultrasound image is the real ultrasound image. In addition, the cycle consistency loss function $L_{cyc}$ may be calculated based on the pre-processed CT image and the reconstructed CT image.

Figure 4:
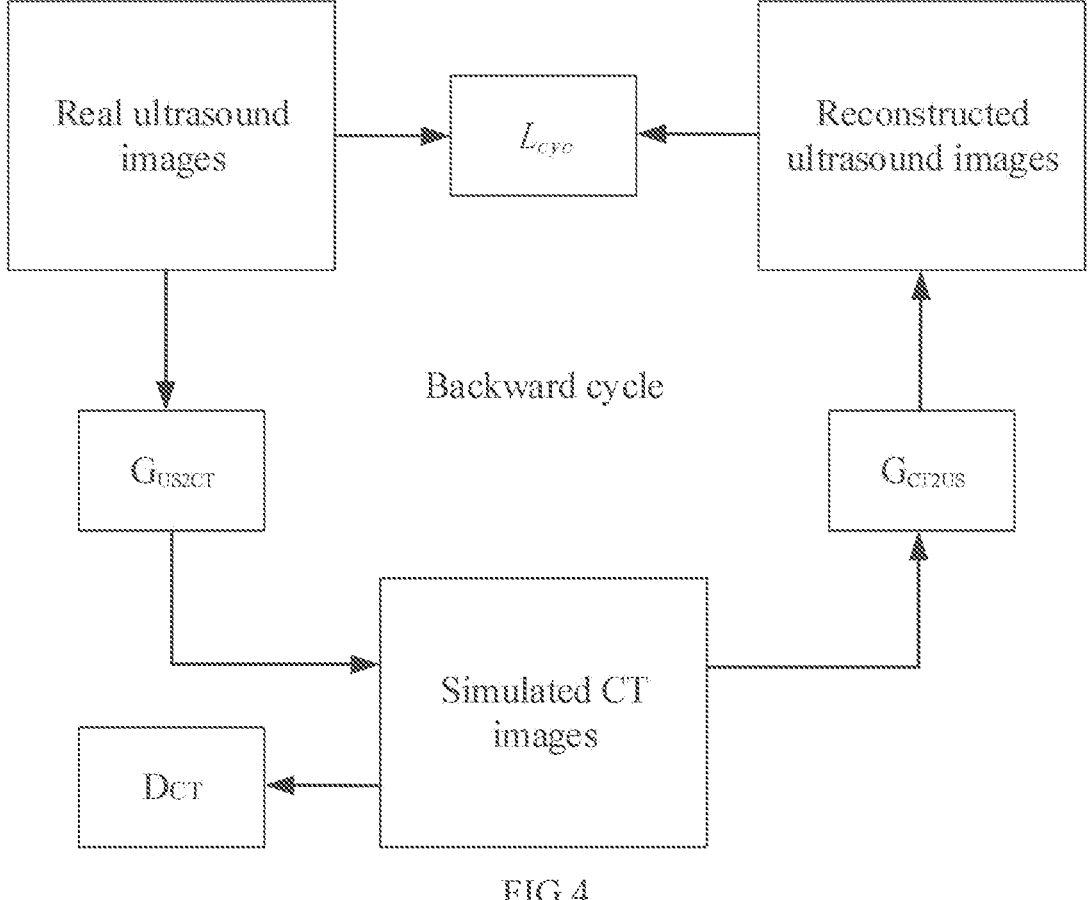
FIG. 4 is a schematic diagram of a processing of a backward cycle of a cycle generative adversarial network according to an embodiment of the present disclosure.

A schematic diagram of a processing of the backward cycle of CycleGAN is illustrated in FIG. 4. The real ultrasound image is processed by the generator $G_{US2CT}$ to generate the simulated CT image. The simulated CT image is processed by the generator $G_{CT2US}$ to obtain the reconstructed ultrasound image. The discriminator $D_{CT}$ is configured to determine whether the generated simulated CT image is the real CT image. In addition, the cycle consistency loss function $L_{cyc}$ may be calculated based on the real ultrasound image and the reconstructed ultrasound image.

To improve performance of the cycle generative adversarial network, it is necessary to calculate the cycle consistency loss function of the cycle generative adversarial network. The cycle consistency loss function can ensure that generators of CycleGAN are bi-directional and reversible. In particular, in the forward cycle and the backward cycle, the cyclic initial image (including the initial CT image in the forward cycle and the initial ultrasound image in the backward cycle) and the reconstructed image (including the reconstructed CT image in the forward cycle and the reconstructed ultrasound image in the backward cycle) are used as inputs to the generators, and then a corresponding cycle consistency loss is calculated using a predetermined formula. For example, the following formula may be used to calculate the cycle consistency loss:

$$L_{cyc}(G,F)=E_{x\sim Pdata(x)}[\|F(G(x))-x\|_1]+E_{y\sim Pdata(y)}[\| G(F(y))-y\|_1],$$

where $L_{cyc}(G,F)$ represents the cycle consistency loss function, x represents an initial image of a cycle, y represents the reconstructed image, G and F represent two generators of the cycle generative adversarial network in a cycle in a same direction (in the forward cycle G and F are generators $G_{CT2US}$ and $G_{US2CT}$, respectively, and in the backward cycle G and F are generators $G_{US2CT}$ and $G_{CT2US}$, respectively), F(y) represents an output image obtained subsequent to input of an image y into the generator F, G(x) represents an output image obtained subsequent to input of an image x into the generator G, E represents solving a mathematical expectation, a subscript x~Pdata(x) corresponding to E represents a probability distribution of the image x, and a subscript y~Pdata(y) corresponding to E represents a probability distribution of the image y.

In addition to the cycle consistency loss function, Cycle-GAN further requires a calculation of the adversarial loss function, which may be calculated using the following formula:

$$L_{GAN}(G,D_Y,X,Y)=E_{y\sim Pdata(y)}[\log D_Y(y)]+ E_{x\sim Pdata(x)}[\log(1-D_Y(G(x)))],$$

where $L_{GAN}(G,D_Y,X,Y)$ represents the adversarial loss function, x represents the initial image of the cycle, y represents the reconstructed image, X represents an image domain of the initial image of the cycle, Y represents an image domain of the reconstructed image, $D_Y$ represents a discriminator configured to determine whether the reconstructed image is a real image or a synthesized simulated image, E represents solving the mathematical expectation, the subscript x~Pdata (x) corresponding to E represents the probability distribution of the image x, and the subscript y~Pdata(y) corresponding to E represents the probability distribution of the image y.

In addition, the adversarial loss function has two parts. In addition to $L_{GAN}(G,D_Y,X,Y)$ described above, the adversarial loss function further has $L_{GAN}(F,D_X,Y,X)$. A total adversarial loss function is a sum of the two parts. An expression of $L_{GAN}(F,D_X,Y,X)$ has the same form as the expression of $L_{GAN}(G,D_Y,X,Y)$, except that G in the latter expression is replaced by F and $D_Y$ in the latter expression by $D_X$ n.

A corresponding target loss function may be calculated based on the cycle consistency loss function and the adversarial loss function that are calculated above. For example, the corresponding target loss function may be calculated by using the following equation:

$$L_m=L_{GAN}(G,D_Y,X,Y)+L_{GAN}(F,D_X,Y,X)+\lambda L_{cyc}(G,F),$$

where $L_m$ represents a total target loss function, and $\lambda$ represents a cycle consistency coefficient.

Furthermore, in the training process of the cycle generative adversarial network, the method can further include: calculating, based on the cyclic initial image and the reconstructed image, a shape consistency loss function of the cycle generative adversarial network, the shape consistency loss function being used to measure a degree of difference between a contour shape of a specified target contained in an input image of the cycle generative adversarial network and a contour shape of a specified target contained in an output image of the cycle generative adversarial network.

During synthesis of the simulated ultrasound image performed by CycleGAN, a large deformation may be generated to an anatomical structure of an original CT image and eventually leads to invalidation of an original label of an original CT image, which brings a problem of a correspondence failure between the original CT image and the generated simulated ultrasound image. To avoid the problem, the present disclosure introduces a new loss function, called the shape consistency loss function. The shape consistency loss function is used to control deformations of anatomical structures of images to ensure that input and output images of CycleGAN have consistent geometric shapes of contours.

In some embodiments, the calculating, based on the cyclic initial image and the reconstructed image, the shape consistency loss function of the cycle generative adversarial network can include: calculating the shape consistency loss function of the cycle generative adversarial network in accordance with the following equation:

$$L_{shape}(G,F,S_X,S_Y)=E_{x\sim Pdata(x)}[-t_Y\log(S_Y(F(x)))]+ E_{y\sim Pdata(y)}[-t_X\log(S_X(G(y)))],$$

where $L_{shape}(G,F,S_X,S_Y)$ represents the shape consistency loss function, G and F represent two generators of the cycle generative adversarial network in a cycle in a same direction (in the forward cycle G and F are generators $G_{CT2US}$ and $G_{US2CT}$, respectively, and in the backward cycle G and F are generators $G_{US2CT}$ and $G_{CT2US}$, respectively), x represents an initial image of the cycle, y represents the reconstructed image, X represents an image domain of the initial image of the cycle, Y represents an image domain of the reconstructed image, tx represents a contour shape of a specified target contained in the initial image of the cycle, ty represents a contour shape of a specified target contained in the reconstructed image, F(x) represents an output image obtained subsequent to input of an image x into the generator F, G(y) represents an output image obtained subsequent to input of an image y into the generator G, Sx and Sy represent two auxiliary mapping relations for mapping images of the image domain X and the image domain Y into a same shape space, and may be implemented by two convolutional neural network modules, also known as segmenters, E represents solving a mathematical expectation, a subscript x~Pdata(x) corresponding to E represents a probability distribution of the image x, and a subscript y~Pdata(y) corresponding to E represents a probability distribution of the image y.

The determining, based on the cycle consistency loss function and the adversarial loss function, the target loss function can include: determining the target loss function based on the cycle consistency loss function, the adversarial loss function, and the shape consistency loss function.

With an introduction of the shape consistency loss function, the total target loss function may be calculated using the following formula:

$$L(G,F,D_X,D_Y,S_X,S_Y)=L_{GAN}(G,D_Y,X,Y)+L_{GAN}(F,D_X,Y,X)+\lambda L_{cyc}(G,F)+\gamma L_{shape}(G,F,S_X,S_Y),$$

where $L(G,F,D_X,D_Y,S_X,S_Y)$ represents the total target loss function, $\lambda$ represents the cycle consistency coefficient, and $\gamma$ represents a shape consistency coefficient. In practice, let $\lambda=10$ and $\gamma=1$.

The training of the cycle generative adversarial network is completed based on the target loss function subsequent to obtaining of the total target loss function. By using the cycle generative adversarial network, the present disclosure achieves a function of synthesizing CT images into simulated ultrasound images, and has advantages of fast synthesis speed, better synthesis effect, and ability to synthesize images in batches. In addition, with the introduction of the shape consistency loss function, deformations of anatomical structures generated in the synthesis of the simulated ultrasound images can be controlled to facilitate subsequent operations of transfer learning.

At block 202, the initial segmentation model is continued to be trained, by employing a transfer learning method, using sample ultrasound images as a training set, to obtain the image segmentation model. Each of the sample ultrasound images is an ultrasound image pre-collected as a training sample.

The initial segmentation model is obtained by completing pre-training in a source domain using synthesized simulated ultrasound images, and then transferred to a target domain for further training. After two times of training, the final image segmentation model is obtained. Experiments show that, with an increase in a similarity between data distributions of the source domain and the target domain, an outcome of the transfer learning becomes better, and a performance improvement of the convolutional neural network becomes more obvious. In the present disclosure, the transfer learning involves two different image modalities. The source domain of the transfer learning is an image domain corresponding to the simulated ultrasound images that are synthesized based on the CT images. The target domain of the transfer learning is an image domain corresponding to the real sample ultrasound images.

The source domain of an existing mainstream transfer learning method is usually a natural image domain or an image domain of a same modality, while the source domain of the present disclosure is the simulated ultrasound images synthesized based on the CT images since the present disclosure uses a cross-modality transfer learning method. A distribution of the simulated ultrasound image is closer to the real ultrasound image than the natural image domain, thereby effectively improving performance of the image segmentation model in an ultrasound image segmentation task.

In the embodiments of the present disclosure, the simulated ultrasound images are synthesized based on the CT images. The image segmentation model is pre-trained using the synthesized simulated ultrasound images. The image segmentation model is migrated, by employing the transfer learning method, to the real sample ultrasound images for further training to obtain the final image segmentation model. A segmentation processing on the ultrasound image to be segmented is completed by the final image segmentation model. In this way, the ultrasound images synthesized based on the CT images can be used to replace a part of training data, thereby solving the problem of lack of training data when training the image segmentation model.

Figure 5:
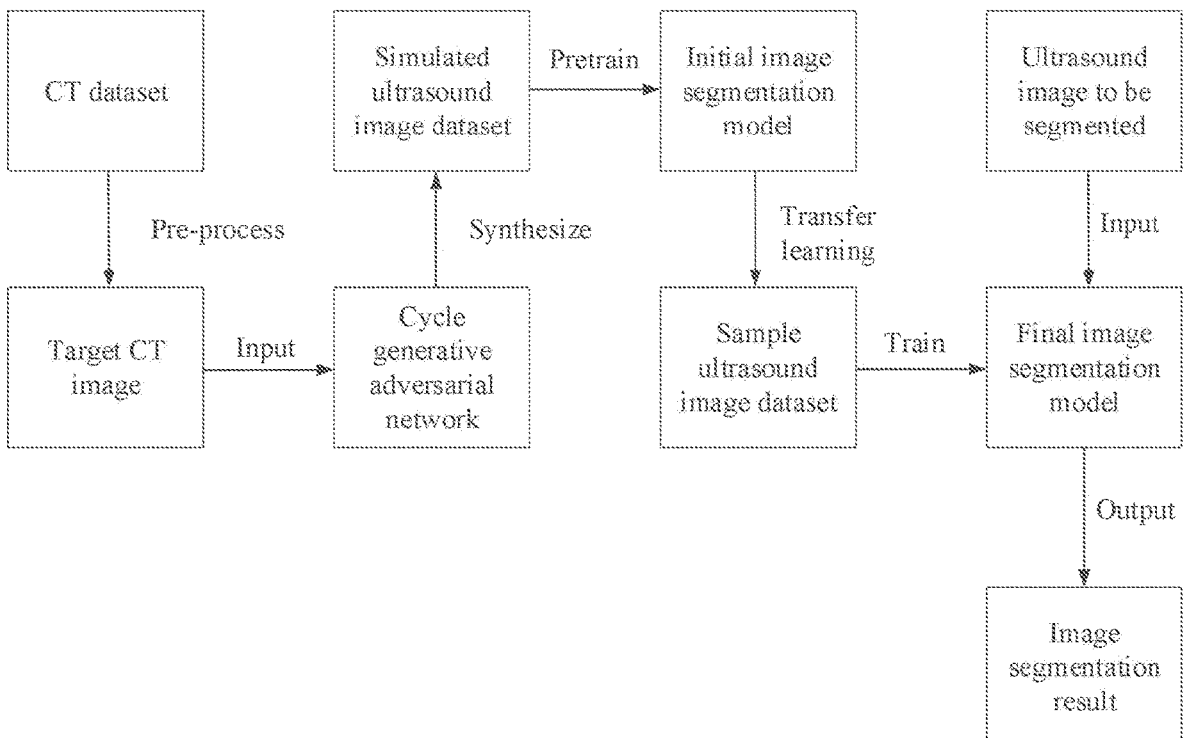
FIG. 5 is a schematic diagram of an operation principle of an ultrasound image segmentation method of the present disclosure according to an embodiment of the present disclosure.

FIG. 5 is a schematic diagram of an operation principle of an ultrasound image segmentation method of the present disclosure. As illustrated in FIG. 5, the pre-collected CT dataset is pre-processed to obtain the target CT image. The target CT image is inputted into the cycle generative adversarial network to synthesize the simulated ultrasound image dataset. Pre-training is performed on the simulated ultrasound image dataset to obtain the initial image segmentation model. The initial image segmentation model is transferred, using the transfer learning method, to the real sample ultrasound image dataset for further training, to obtain the final image segmentation model. The corresponding image segmentation result can be obtained by inputting the ultrasound image to be segmented into the final image segmentation model.

In summary, the present disclosure provides the ultrasound image segmentation method based on few-shot training. In a case of limited ultrasound training data, the simulated ultrasound images are synthesized based on the CT images by using the cycle generative adversarial network and the cross-modality transfer learning method to solve a problem of lack of ultrasound image training data. Furthermore, knowledge in a CT image modality is fully utilized to enhance accuracy, generalization performance, and clinical practicality of the image segmentation model.

It should be understood that numerical values of sequence numbers of respective steps in the above embodiments do not indicate an order of execution. The order of execution of respective processes should be determined by functions and internal logics of the processes, and should not constitute any limitation on an implementation process of the embodiments of the present disclosure.

The above description mainly describes the ultrasound image segmentation method. An ultrasound image segmentation apparatus will be described below.

Figure 6:
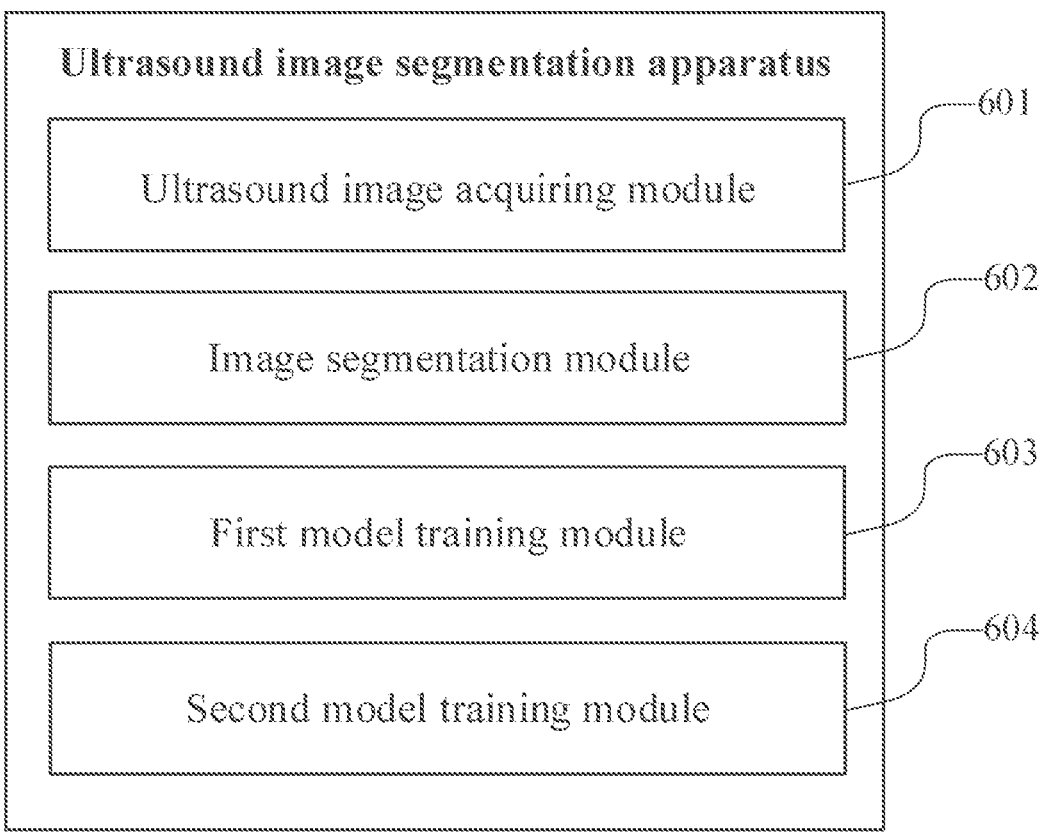
FIG. 6 is a structural diagram of an embodiment of an ultrasound image segmentation apparatus according to an embodiment of the present disclosure.

As illustrated in FIG. 6, in an embodiment, the ultrasound image segmentation apparatus according to the embodiments of the present disclosure includes an ultrasound image acquiring module 601, an image segmentation module 602, a first model training module 603, and a second model training module 604.

The ultrasound image acquiring module 601 is configured to acquire an ultrasound image to be segmented.

The image segmentation module 602 is configured to input the ultrasound image to be segmented into a trained image segmentation model, to obtain an image segmentation result of the ultrasound image to be segmented.

The first model training module 603 is configured to perform pre-training by using simulated ultrasound images as a training set to obtain an initial segmentation model. Each of the simulated ultrasound images is an ultrasound image synthesized based on a CT image.

The second model training module 604 is configured to continue training, by employing a transfer learning method, the initial segmentation model using sample ultrasound images as a training set, to obtain the image segmentation model. Each of the sample ultrasound images is an ultrasound image pre-collected as a training sample.

In an embodiment of the present disclosure, the ultrasound image segmentation apparatus can further include a CT dataset acquiring module, a CT data pre-processing module, and an ultrasound image synthesis module.

The CT dataset acquiring module is configured to acquire a pre-collected CT dataset.

The CT data pre-processing module is configured to perform a pre-processing operation on the CT dataset to obtain a target CT image.

The ultrasound image synthesis module is configured to input the target CT image into a pre-trained cycle generative adversarial network to synthesize the simulated ultrasound image.

Further, the CT dataset includes CT images in a three-dimensional volume data format. The CT data pre-processing module can include a CT image parameter adjustment unit, a CT data slice unit, and a region of interest extraction unit.

The CT image parameter adjustment unit is configured to adjust a window level and a window width of the CT images in the CT dataset.

The CT data slice unit is configured to obtain a plurality of two-dimensional slice CT images by performing a slicing operation on three-dimensional volume data of the CT images in the CT dataset along specified directions, respectively.

The region of interest extraction unit is configured to extract, from the plurality of two-dimensional slice CT images, an image of a region of interest as the target CT image.

Further, the CT images of the CT dataset each have a predetermined label, and the predetermined label marks a contour of a specified target in the CT image. The CT data pre-processing module can further include a CT image deletion unit.

The CT image deletion unit is configured to delete, from the plurality of two-dimensional slice CT images, a slice CT image in which a size of a contour of a specified target is smaller than a predetermined threshold.

The region of interest extraction unit can be specifically configured to: for each of the plurality of two-dimensional slice CT images, calculate, based on the contour of the specified target in the CT image, a position of a center of mass of the specified target in the CT image, and frame, centered on the position of the center of mass, an image region of a specified size from the CT image as the image of the region of interest extracted from the CT image.

In an embodiment of the present disclosure, the ultrasound image segmentation apparatus can further include a cycle consistency loss function calculation module, an adversarial loss function calculation module, a target loss function determination module, and a cycle generative adversarial network training module.

The cycle consistency loss function calculation module is configured to calculate, in a forward cycle and a backward cycle of the cycle generative adversarial network, a cycle consistency loss function of the cycle generative adversarial network based on a cyclic initial image and a reconstructed image. The forward cycle is a process of synthesizing the CT image into the simulated ultrasound image and reconstructing the simulated ultrasound image as the CT image. The backward cycle is a process of synthesizing the ultrasound image into a simulated CT image and reconstructing the simulated CT image as the ultrasound image. The cyclic initial image includes an initial CT image in the forward cycle and an initial ultrasound image in the backward cycle. The reconstructed image includes the CT image reconstructed in the forward cycle and the ultrasound image reconstructed in the backward cycle.

The adversarial loss function calculation module is configured to calculate, based on the cyclic initial image and the reconstructed image, an adversarial loss function of the cycle generative adversarial network.

The target loss function determination module is configured to determine, based on the cycle consistency loss function and the adversarial loss function, a target loss function.

The cycle generative adversarial network training module is configured to complete, based on the target loss function, training of the cycle generative adversarial network.

Further, the ultrasound image segmentation apparatus can further include a shape consistency loss function calculation module.

The shape consistency loss function calculation module is configured to calculate, based on the cyclic initial image and the reconstructed image, a shape consistency loss function of the cycle generative adversarial network. The shape consistency loss function is used to measure a degree of difference between a contour shape of a specified target contained in an input image of the cycle generative adversarial network and a contour shape of a specified target contained in an output image of the cycle generative adversarial network.

The target loss function determination module is specifically configured to determine the target loss function based on the cycle consistency loss function, the adversarial loss function, and the shape consistency loss function.

Further, the shape consistency loss function calculation module can be specifically configured to calculate the shape consistency loss function of the cycle generative adversarial network in accordance with the following equation:

$$L_{shape}(G,F,S_X,S_Y)=E_{x \sim p_{data}(x)}[-t_Y \log(S_Y(F(x)))]+ \\ E_{y \sim p_{data}(y)}[-t_X \log(S_X(G(y)))],$$

where $L_{shape}(G,F,S_X, S_Y)$ represents the shape consistency loss function, G and F represent two generators of the cycle generative adversarial network in a cycle in a same direction, x represents an initial image of the cycle, y represents the reconstructed image, X represents an image domain of the initial image of the cycle, Y represents an image domain of the reconstructed image, $t_x$ represents a contour shape of a specified target contained in the initial image of the cycle, $t_y$ represents a contour shape of a specified target contained in the reconstructed image, F(x) represents an output image obtained subsequent to input of an image x into the generator F, G(y) represents an output image obtained subsequent to input of an image y into the generator G, $S_x$ and $S_y$ represent two auxiliary mapping relations for mapping images of the image domain X and the image domain Y into a same shape space, E represents solving a mathematical expectation, a subscript x~Pdata(x) corresponding to E represents a probability distribution of the image x, and a subscript y~Pdata (y) corresponding to E represents a probability distribution of the image y.

The embodiments of the present disclosure further provide a computer-readable storage medium. The computer-readable storage medium stores a computer program. The computer program, when executed by a processor, implements any ultrasound image segmentation method as illustrated in FIG. 1.

The embodiments of the present disclosure further provide a computer program product. The computer program product, when executed on a terminal device, causes the terminal device to perform any ultrasound image segmentation method as illustrated in FIG. 1.

Figure 7:
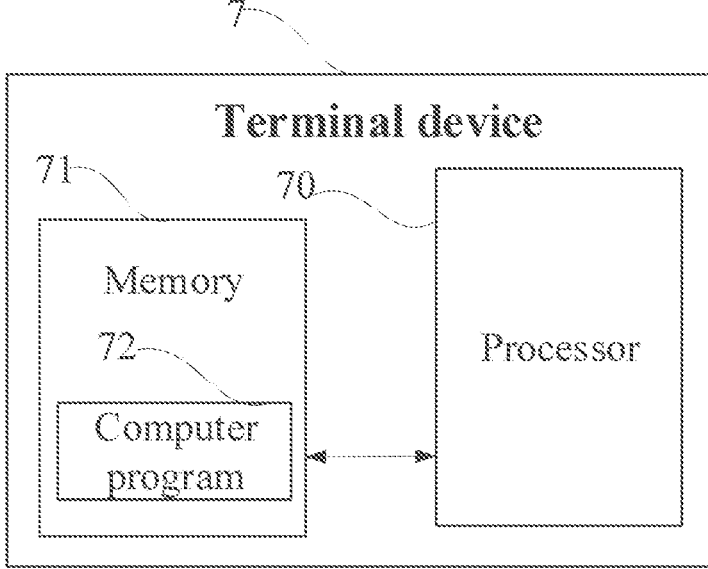
FIG. 7 is a schematic diagram of a terminal device according to an embodiment of the present disclosure.

FIG. 7 is a schematic diagram of a terminal device according to an embodiment of the present disclosure. As illustrated in FIG. 7, a terminal device 7 according to the embodiment includes a processor 70, a memory 71, and a computer program 72 stored in the memory 71 and executable on the processor 70. The processor 70 can be configured to, when executing the computer program 72, implement the steps in each of the above embodiments of the ultrasound image segmentation method, e.g., operations at block 101 and block 102 illustrated in FIG. 1. Alternatively, the processor 70 can be configured to, when executing the computer program 72, implement functions of each module/unit in each of the above embodiments of the apparatus, e.g., functions of modules 601 to 604 illustrated in FIG. 6.

The computer program 72 may be divided into one or more modules/units. The one or more modules/units are stored in the memory 71 and executed by the processor 70 to complete the present disclosure. The one or more modules/units may be a series of computer program instruction segments capable of performing specific functions. The instruction segments are used to describe an execution process of the computer program 72 in the terminal device 7.

The processor 70 may be a Central Processing Unit (CPU), a general-purpose processor, a Digital Signal Processor (DSP), an Application Specific Integrated Circuit (ASIC), a Field-Programmable Gate Array (FPGA) or other programmable logic devices, a discrete gate or a transistor logic device, a discrete hardware component, etc. The general-purpose processor may be a microprocessor or any conventional processor, etc.

The memory 71 may be an internal storage unit of the terminal device 7, such as a hard disk or memory of the terminal device 7. The memory 71 may also be an external storage device of the terminal device 7, such as a plug-in hard disk equipped on the terminal device 7, a Smart Media Card (SMC), a Secure Digital (SD) card, a Flash Card, or the like. Further, the memory 71 may further include both the internal storage unit of the terminal device 7 and the external storage device of the terminal device 7. The memory 71 is configured to store a computer program and other programs and data required by the terminal device. The memory 71 can also be configured to temporarily store data that has been outputted or will be outputted.

Those skilled in the art can clearly understand that, for convenience and conciseness of description, the divisions of the above functional units and modules are merely illustrative. In practical applications, the above functions can be allocated to different functional units and modules for implementation as required. That is, an internal structure of the apparatus is divided into different functional units or modules to complete all or part of the functions described above. The functional units and modules in the embodiments may be integrated into one processing unit, or each unit may exist physically alone, or two or more units may be integrated into one unit. The integrated units can be implemented in a form of hardware, or in a form of a software functional unit. In addition, specific names of the functional units and modules are only for the convenience of distinguishing one from another, and are not used to limit the scope of the present disclosure. For a specific working process of the units and modules in the above system, reference may be made to a corresponding process in the above method embodiments, and details thereof will not be repeated herein.

Those skilled in the art can clearly understand that, for convenience and conciseness of description, a specific working process of the system, apparatus, and units described above may refer to a corresponding process of the above-mentioned method embodiments, and details thereof will be omitted herein.

In above embodiments, description of respective embodiments emphasizes different aspects, and for parts that are not detailed or described in some embodiments, reference may be made to relevant description of other embodiments.

Those skilled in the art could be aware that, exemplary units and algorithm steps described in combination with embodiments disclosed herein may be implemented by electronic hardware or in a combination of computer software and electronic hardware. Whether these functions are executed by hardware or software depends upon the specific use and design constraints of the technical solutions. Those skilled in the art may adopt different methods for different specific uses to implement described functions, which should not be regarded as going beyond the scope of the present disclosure.

In the embodiments provided by the present disclosure, it should be understood that, the disclosed apparatus and method may be implemented in other ways. For example, the system embodiments described above are merely illustrative. For example, the modules or units are merely divided based on the logic functions, and they can be divided in other ways in actual implementations. For example, a plurality of units or components may be combined or may be integrated into another system, or some features may be omitted or not executed. In addition, the mutual coupling or direct coupling or communication connection between these units illustrated or discussed above may be via some interfaces, or the indirect coupling or communication connection between devices or units may be in an electrical, mechanical, or other manner.

The units described as separate parts may or may not be physically separated. Parts illustrated as units may or may not be physical units, i.e., the parts may be located in one place, or may be distributed on a plurality of network units. Some or all of the units can be selected according to actual needs to achieve objects of the solutions of the embodiments.

In addition, respective functional units in respective embodiments of the present disclosure may be integrated in one processing unit, or the respective units may be separate physical existence, or two or more units may be integrated in one unit. The above integrated units can be implemented in a form of hardware, or in a form of a functional software unit.

If the integrated units are realized in a form of functional software units and are sold or used as separate products, the integrated modules/units can be stored in a computer-readable storage medium. Based on this understanding, all or part of the processes in the above method embodiments of the present disclosure may also be implemented by relevant hardware instructed by a computer program. The computer program can be stored in a computer-readable storage medium. When the computer program is executed by the processor, steps of the above method embodiments may be implemented. The computer program may include computer program codes. The computer program codes may be in a form of source codes, object codes, an executable file, or some intermediate forms, etc. The computer-readable medium may include any entity or device capable of carrying the computer program codes, a recording medium, a USB disk, a mobile hard disk, a magnetic disk, an optical disk, a computer memory, a Read-Only Memory (ROM), a Random Access Memory (RAM), an electric carrier signal, a telecommunications signal, and a software distribution medium, etc. It should be noted that content contained in the computer-readable medium can be appropriately added or deleted in accordance with requirements of legislation and patent practices in respective judicial districts. For example, in some judicial districts, according to the legislation and patent practices, the computer-readable medium excludes electrical carrier signals and telecommunication signals.

As mentioned above, the above embodiments are only used to illustrate, rather than to limit, the technical solutions of the present disclosure. Although the present disclosure is described in detail with reference to the above embodiments, those skilled in the art should understand that modifications may be made to the technical solutions described in the above embodiments, or equivalent replacements may be made to some of the technical features of the technical solutions described in the above embodiments. However, these modifications or replacements do not cause a deviation of the essence of corresponding technical solutions from the spirit and scope of the technical solutions of the embodiments of the present disclosure, and shall be contained in the scope of the present disclosure.

What is claimed is:

1. An ultrasound image segmentation method, comprising:

acquiring an ultrasound image to be segmented; and inputting the ultrasound image to be segmented into a trained image segmentation model, to obtain an image segmentation result of the ultrasound image to be segmented, wherein the image segmentation model is obtained by training comprising:

performing pre-training by using simulated ultrasound images as a training set to obtain an initial segmentation model, each of the simulated ultrasound images being an ultrasound image synthesized based on a Computed Tomography (CT) image; and continuing training, by employing a transfer learning method, the initial segmentation model using sample ultrasound images as a training set, to obtain the image segmentation model, each of the sample ultrasound images being an ultrasound image pre-collected as a training sample, wherein the simulated ultrasound image is synthesized by:

acquiring a pre-collected CT dataset;

performing a pre-processing operation on the CT dataset to obtain a target CT image; and inputting the target CT image into a pre-trained cycle generative adversarial network to synthesize the simulated ultrasound image, wherein the cycle generative adversarial network is obtained by training comprising:

in a forward cycle and a backward cycle of the cycle generative adversarial network, calculating a cycle consistency loss function of the cycle generative adversarial network based on a cyclic initial image and a reconstructed image, wherein the forward cycle is a process of synthesizing the CT image into the simulated ultrasound image and reconstructing the simulated ultrasound image as the CT image, the backward cycle is a process of synthesizing the ultrasound image into a simulated CT image and reconstructing the simulated CT image as the ultrasound image, the cyclic initial image comprises an initial CT image in the forward cycle and an initial ultrasound image in the backward cycle, and the reconstructed image comprises the CT image reconstructed in the forward cycle and the ultrasound image reconstructed in the backward cycle;

calculating, based on the cyclic initial image and the reconstructed image, an adversarial loss function of the cycle generative adversarial network;

determining, based on the cycle consistency loss function and the adversarial loss function, a target loss function; and completing, based on the target loss function, training of the cycle generative adversarial network.

2. The method according to claim 1, wherein the CT dataset comprises CT images in a three-dimensional volume data format, and said performing the pre-processing operation on the CT dataset to obtain the target CT image comprises:

adjusting a window level and a window width of the CT images in the CT dataset;

obtaining a plurality of two-dimensional slice CT images by performing a slicing operation on three-dimensional volume data of the CT images in the CT dataset along specified directions, respectively; and extracting, from the plurality of two-dimensional slice CT images, an image of a region of interest as the target CT image.

3. The method according to claim 2, wherein the CT images of the CT dataset each have a predetermined label, and the predetermined label marks a contour of a specified target in the CT image;

the method further comprises, subsequent to said obtaining the plurality of two-dimensional sliced CT images:

deleting, from the plurality of two-dimensional slice CT images, a slice CT image in which a size of a contour of a specified target is smaller than a predetermined threshold; and said extracting, from the plurality of two-dimensional slice CT images, the image of the region of interest comprises:

for each of the plurality of two-dimensional slice CT images, calculating, based on the contour of the specified target in the CT image, a position of a center of mass of the specified target in the CT image, and framing, centered on the position of the center of mass, an image region of a specified size from the CT image as the image of the region of interest extracted from the CT image.

4. The method according to claim 1, further comprising:

calculating, based on the cyclic initial image and the reconstructed image, a shape consistency loss function of the cycle generative adversarial network, the shape consistency loss function being used to measure a degree of difference between a contour shape of a specified target contained in an input image of the cycle generative adversarial network and a contour shape of a specified target contained in an output image of the cycle generative adversarial network, wherein said determining, based on the cycle consistency loss function and the adversarial loss function, the target loss function comprises determining the target loss function based on the cycle consistency loss function, the adversarial loss function, and the shape consistency loss function.

5. The method according to claim 4, wherein said calculating, based on the cyclic initial image and the reconstructed image, the shape consistency loss function of the cycle generative adversarial network comprises:

calculating the shape consistency loss function of the cycle generative adversarial network in accordance with the following equation:

$$L_{shape}(G,F,S_X,S_Y)=E_{x\sim P_{data}(x)}[-t_Y\log(S_Y(F(x)))]+$$
$$E_{y\sim P_{data}(y)}[-t_X\log(S_X(G(y)))],$$

where $L_{shape}(G,F,SX,SY)$ represents the shape consistency loss function, G and F represent two generators of the cycle generative adversarial network in a cycle in a same direction, x represents an initial image of the cycle, y represents the reconstructed image, X represents an image domain of the initial image of the cycle, Y represents an image domain of the reconstructed image, $t_x$ represents a contour shape of a specified target contained in the initial image of the cycle, $t_y$ represents a contour shape of a specified target contained in the reconstructed image, $F(x)$ represents an output image obtained subsequent to input of an image x into the generator F, $G(y)$ represents an output image obtained subsequent to input of an image y into the generator G, $S_x$ and $S_y$ represent two auxiliary mapping relations for mapping images of the image domain X and the image domain Y into a same shape space, E represents solving a mathematical expectation, a subscript x~Pdata(x) corresponding to E represents a probability distribution of the image x, and a subscript y~Pdata(y) corresponding to E represents a probability distribution of the image y.

6. An ultrasound image segmentation apparatus, comprising:

an ultrasound image acquiring module configured to acquire an ultrasound image to be segmented;

an image segmentation module configured to input the ultrasound image to be segmented into a trained image segmentation model, to obtain an image segmentation result of the ultrasound image to be segmented;

a first model training module configured to perform pre-training by using simulated ultrasound images as a training set to obtain an initial segmentation model, each of the simulated ultrasound images being an ultrasound image synthesized based on a CT image; and a second model training module configured to continue training, by employing a transfer learning method, the initial segmentation model using sample ultrasound images as a training set, to obtain the image segmentation model, each of the sample ultrasound images being an ultrasound image pre-collected as a training sample, wherein the simulated ultrasound image is synthesized by:

acquiring a pre-collected CT dataset;

performing a pre-processing operation on the CT dataset to obtain a target CT image; and inputting the target CT image into a pre-trained cycle generative adversarial network to synthesize the simulated ultrasound image, wherein the cycle generative adversarial network is obtained by training comprising:

in a forward cycle and a backward cycle of the cycle generative adversarial network, calculating a cycle consistency loss function of the cycle generative adversarial network based on a cyclic initial image and a reconstructed image, wherein the forward cycle is a process of synthesizing the CT image into the simulated ultrasound image and reconstructing the simulated ultrasound image as the CT image, the backward cycle is a process of synthesizing the ultrasound image into a simulated CT image and reconstructing the simulated CT image as the ultrasound image, the cyclic initial image comprises an initial CT image in the forward cycle and an initial ultrasound image in the backward cycle, and the reconstructed image comprises the CT image reconstructed in the forward cycle and the ultrasound image reconstructed in the backward cycle;

calculating, based on the cyclic initial image and the reconstructed image, an adversarial loss function of the cycle generative adversarial network;

determining, based on the cycle consistency loss function and the adversarial loss function, a target loss function; and completing, based on the target loss function, training of the cycle generative adversarial network.

7. A terminal device, comprising a memory, a processor, and a computer program stored in the memory and executable on the processor, wherein the processor, when executing the computer program, implements an ultrasound image segmentation method, comprising:

acquiring an ultrasound image to be segmented; and inputting the ultrasound image to be segmented into a trained image segmentation model, to obtain an image segmentation result of the ultrasound image to be segmented, wherein the image segmentation model is obtained by training comprising:

performing pre-training by using simulated ultrasound images as a training set to obtain an initial segmentation model, each of the simulated ultrasound images being an ultrasound image synthesized based on a Computed Tomography (CT) image; and continuing training, by employing a transfer learning method, the initial segmentation model using sample ultrasound images as a training set, to obtain the image segmentation model, each of the sample ultrasound images being an ultrasound image pre-collected as a training sample, wherein the simulated ultrasound image is synthesized by:

acquiring a pre-collected CT dataset;

performing a pre-processing operation on the CT dataset to obtain a target CT image; and inputting the target CT image into a pre-trained cycle generative adversarial network to synthesize the simulated ultrasound image, wherein the cycle generative adversarial network is obtained by training comprising:

in a forward cycle and a backward cycle of the cycle generative adversarial network, calculating a cycle consistency loss function of the cycle generative adversarial network based on a cyclic initial image and a reconstructed image, wherein the forward cycle is a process of synthesizing the CT image into the simulated ultrasound image and reconstructing the simulated ultrasound image as the CT image, the backward cycle is a process of synthesizing the ultrasound image into a simulated CT image and reconstructing the simulated CT image as the ultrasound image, the cyclic initial image comprises an initial CT image in the forward cycle and an initial ultrasound image in the backward cycle, and the reconstructed image comprises the CT image reconstructed in the forward cycle and the ultrasound image reconstructed in the backward cycle;

calculating, based on the cyclic initial image and the reconstructed image, an adversarial loss function of the cycle generative adversarial network;

determining, based on the cycle consistency loss function and the adversarial loss function, a target loss function; and completing, based on the target loss function, training of the cycle generative adversarial network.

8. The terminal device according to claim 7, wherein the CT dataset comprises CT images in a three-dimensional volume data format, and said performing the pre-processing operation on the CT dataset to obtain the target CT image comprises:

adjusting a window level and a window width of the CT images in the CT dataset;

obtaining a plurality of two-dimensional slice CT images by performing a slicing operation on three-dimensional volume data of the CT images in the CT dataset along specified directions, respectively; and extracting, from the plurality of two-dimensional slice CT images, an image of a region of interest as the target CT image.

9. The terminal device according to claim 8, wherein the CT images of the CT dataset each have a predetermined label, and the predetermined label marks a contour of a specified target in the CT image;

the method further comprises, subsequent to said obtaining the plurality of two-dimensional sliced CT images:

deleting, from the plurality of two-dimensional slice CT images, a slice CT image in which a size of a contour of a specified target is smaller than a predetermined threshold; and said extracting, from the plurality of two-dimensional slice CT images, the image of the region of interest comprises:

for each of the plurality of two-dimensional slice CT images, calculating, based on the contour of the specified target in the CT image, a position of a center of mass of the specified target in the CT image, and framing, centered on the position of the center of mass, an image region of a specified size from the CT image as the image of the region of interest extracted from the CT image.

10. The terminal device according to claim 7, wherein the method further comprises:

calculating, based on the cyclic initial image and the reconstructed image, a shape consistency loss function of the cycle generative adversarial network, the shape consistency loss function being used to measure a degree of difference between a contour shape of a specified target contained in an input image of the cycle generative adversarial network and a contour shape of a specified target contained in an output image of the cycle generative adversarial network, wherein said determining, based on the cycle consistency loss function and the adversarial loss function, the target loss function comprises determining the target loss function based on the cycle consistency loss function, the adversarial loss function, and the shape consistency loss function.

11. The terminal device according to claim 10, wherein said calculating, based on the cyclic initial image and the reconstructed image, the shape consistency loss function of the cycle generative adversarial network comprises:

calculating the shape consistency loss function of the cycle generative adversarial network in accordance with the following equation:

$$L_{shape}(G,F,S_X,S_Y) = E_{x \sim Pdata(x)}[-t_Y \log(S_Y(F(x)))] + E_{y \sim Pdata(y)}[-t_X \log(S_X(G(y)))],$$

where $L_{shape}(G,F,SX,SY)$ represents the shape consistency loss function, G and F represent two generators of the cycle generative adversarial network in a cycle in a same direction, x represents an initial image of the cycle, y represents the reconstructed image, X represents an image domain of the initial image of the cycle, Y represents an image domain of the reconstructed image, $t_x$ represents a contour shape of a specified target contained in the initial image of the cycle, $t_y$ represents a contour shape of a specified target contained in the reconstructed image, F(x) represents an output image obtained subsequent to input of an image x into the generator F, G(y) represents an output image obtained subsequent to input of an image y into the generator G, $S_x$ and $S_y$ represent two auxiliary mapping relations for mapping images of the image domain X and the image domain Y into a same shape space, E represents solving a mathematical expectation, a subscript x~Pdata(x) corresponding to E represents a probability distribution of the image x, and a subscript y~Pdata(y) corresponding to E represents a probability distribution of the image y.

12. A non-transitory computer-readable storage medium, the computer-readable storage medium having a computer program stored thereon, wherein the computer program, when executed by a processor, implements the ultrasound image segmentation method according to claim 1.

13. The non-transitory computer-readable storage medium according to claim 12, wherein the CT dataset comprises CT images in a three-dimensional volume data format, and said performing the pre-processing operation on the CT dataset to obtain the target CT image comprises:

adjusting a window level and a window width of the CT images in the CT dataset;

obtaining a plurality of two-dimensional slice CT images by performing a slicing operation on three-dimensional volume data of the CT images in the CT dataset along specified directions, respectively; and extracting, from the plurality of two-dimensional slice CT images, an image of a region of interest as the target CT image.

14. The non-transitory computer-readable storage medium according to claim 13, wherein the CT images of the CT dataset each have a predetermined label, and the predetermined label marks a contour of a specified target in the CT image;

the method further comprises, subsequent to said obtaining the plurality of two-dimensional sliced CT images:

deleting, from the plurality of two-dimensional slice CT images, a slice CT image in which a size of a contour of a specified target is smaller than a predetermined threshold; and said extracting, from the plurality of two-dimensional slice CT images, the image of the region of interest comprises:

for each of the plurality of two-dimensional slice CT images, calculating, based on the contour of the specified target in the CT image, a position of a center of mass of the specified target in the CT image, and framing, centered on the position of the center of mass, an image region of a specified size from the CT image as the image of the region of interest extracted from the CT image.

\* \* \* \* \*